G. M. COLLINS.
VEHICLE TIRE.
APPLICATION FILED SEPT. 8, 1919.

1,415,994.

Patented May 16, 1922.

Witness

Inventor
G. M. Collins.

By C. A. Snow & Co.
Attorneys

UNITED STATES PATENT OFFICE.

GEORGE M. COLLINS, OF SPRAGUE, WASHINGTON.

VEHICLE TIRE.

1,415,994.  Specification of Letters Patent.  Patented May 16, 1922.

Application filed September 8, 1919. Serial No. 322,288.

*To all whom it may concern:*

Be it known that I, GEORGE M. COLLINS, a citizen of the United States, residing at Sprague, in the county of Lincoln and State of Washington, have invented a new and useful Vehicle Tire, of which the following is a specification.

This invention relates to vehicle tires to be used in lieu of pneumatic tires, one of its objects being to provide a tire utilizing cushioning springs of novel form secured in place so that they will not work loose or produce friction while in use.

A further object is to provide a tire of this character which can be placed on and removed from a wheel rim readily and which is so constructed that it will properly resist all side strains.

With the foregoing and other objects in view which will appear as the description proceeds the invention consists of certain novel details of construction and combinations of parts which will be hereinafter more fully described and pointed out in the claims, it being understood that various changes may be made in the construction and arrangement of the parts without departing from the spirit or sacrificing any of the advantages of the invention as set forth in the appended claim.

In the accompanying drawings the preferred form of the invention has been shown.

In said drawings—

Figure 1:
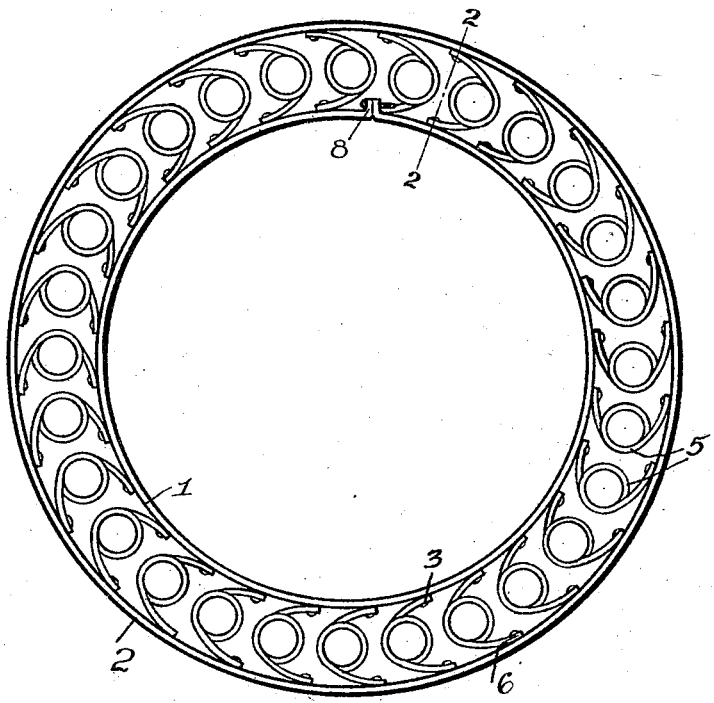
Figure 1 is a side elevation of the tire.
Figure 2:
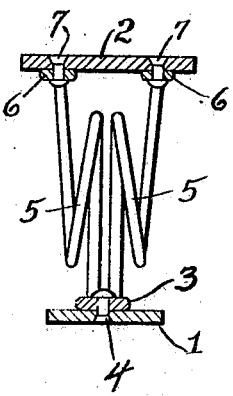
Figure 2 is an enlarged transverse section on line 2—2, Figure 1.

Referring to the figures by characters of reference 1 and 2 designate inner and outer metal rings. These rings are connected by an annular series of springs all correspondingly constructed and arranged. Each spring includes a single length of heavy spring wire folded at the center to form a loop 3 riveted or otherwise fastened to the inner ring, as shown at 4. The two members of the spring extending from the loop 3 are extended parallel for a portion of their lengths and are then coiled laterally in opposite directions respectively, as shown at 5 so that the outer terminals of said members, which are bent to form eyes 6 are spread apart a much greater distance than the parallel portions of the members. The inner ring 1 is preferably narrower than the outer ring 2 and the eyes 6 are fastened to ring 2 near the edges thereof by rivets 7 or the like. The inner ring 1 is preferably split with out-turned ends 8 bolted together as shown.

In using the tire the ends of the ring 1 are loosened or unfastened and said ring is then placed on the rim of the wheel. The fastening bolt or bolts are then tightened so as to draw the ring 1 tightly around the wheel, thereby fastening the tire securely to the wheel. The one piece springs are simple, durable and efficient, will resist side strains and absorb shocks so that the tire will constitute an efficient substitute for pneumatic tires.

What is claimed is:—

A tire including an inner ring, an outer ring, an annular series of springs interposed between the rings and out of contact with each other, each spring including a single length of spring metal folded to form an elongated loop, parallel members extending from the loop and each merging into a coil, the two coils being oppositely pitched, each coil terminating in an arm having a terminal eye, said arms and the elongated loop being extended along diverging lines in the same general direction from the coils, and means for securing the eyes of the spring to the outer ring and the free end of the loop of the spring to the inner ring.

In testimony that I claim the foregoing as my own, I have hereto affixed my signature in the presence of two witnesses.

GEORGE M. COLLINS.

Witnesses:
P. N. SMALLEY,
J. F. HALL.